UNITED STATES PATENT OFFICE.

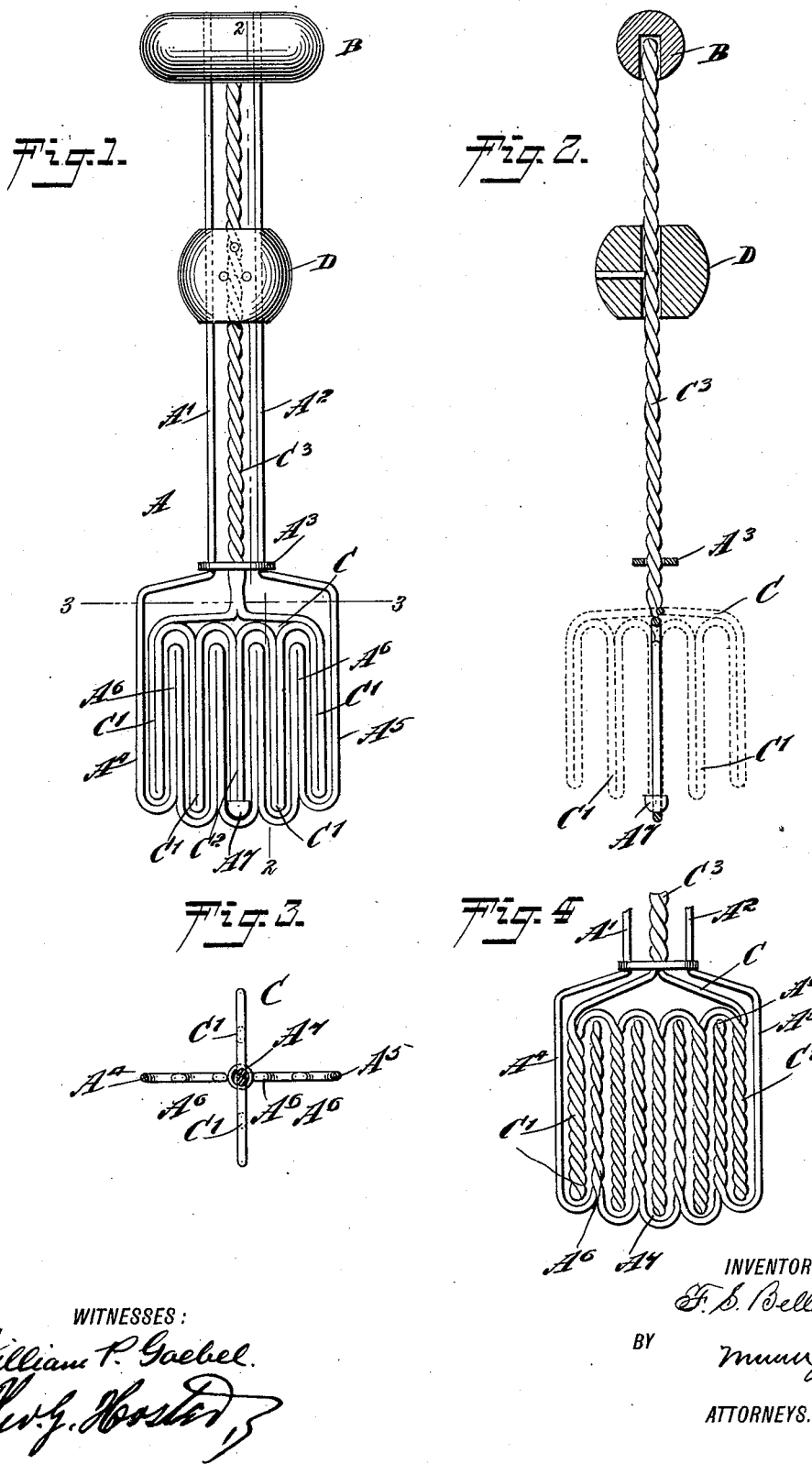

FRANK S. BELLANGER, OF WATERBURY, CONNECTICUT, ASSIGNOR TO D. J. BARRY & CO., OF NEW YORK, N. Y.

EGG-BEATER.

SPECIFICATION forming part of Letters Patent No. 602,152, dated April 12, 1898.

Application filed January 28, 1897. Serial No. 620,999. (No model.)

*To all whom it may concern:*

Be it known that I, FRANK S. BELLANGER, of Waterbury, in the county of New Haven and State of Connecticut, have invented a new and Improved Egg-Beater, of which the following is a full, clear, and exact description.

The object of the invention is to provide a new and improved egg-beater which is simple and durable in construction, very effective in operation, and easily manipulated.

The invention consists of certain parts and details of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a transverse section of the same on the line 2 2 of Fig. 1. Fig. 3 is a sectional plan of the same, and Fig. 4 is a side elevation of a modified form of the frame and beater.

The improved egg-beater is provided with a frame A, preferably made of a single piece of wire formed into the parallel guideways $A'$ $A^2$, secured at their ends in a handle B. The guideways are connected with each other by a cross-piece $A^3$ and terminate in the outer arms $A^4$ and $A^5$, between which extend the arms $A^6$, arranged parallel one to the other and parallel to the outer arms $A^4 A^5$, as plainly shown in the drawings. Each of the arms $A^6$ is formed by doubling the wire, as shown in Fig. 1, or twisting the same, as shown in Fig. 4.

The beater C is mounted to revolve in the frame A and is likewise formed of a single piece of wire bent to form the fingers $C'$ by doubling or twisting the wire, as indicated in Figs. 1 and 4. The central finger $C^2$ extends between the middle arms $A^6$, and its lower or outer end is mounted to turn in a socket $A^7$, attached to the wire forming the connection between the middle arms $A^6$.

The fingers are arranged parallel to each other and the arms $A^4 A^5 A^6$ and are adapted to pass between the said arms on revolving the beater. The latter has the ends of its wire twisted to form a screw-rod $C^3$ in alinement with the middle finger $C^2$, previously mentioned, the screw-rod having its bearings in the handle B and the cross-piece $A^3$, so that the beater has bearings in the said handle, the cross-piece, and the socket $A^7$.

The screw-rod $C^3$ is engaged by a nut D, held to slide in the guideways $A' A^2$ and adapted to be taken hold of by the operator to move the nut up and down and cause a revolving of the screw-rod $C^3$, and consequently of the entire beater C.

When the beater C revolves, the fingers $C'$ pass between the arms $A^4$, $A^5$, and $A^6$ and close to the same, so that the egg is well beaten.

Having thus described my invention, I claim as new and desire to secure by Letters Patent—

1. An egg-beater, comprising a frame provided with parallel guide-rods having a handle at their upper ends, and with a series of parallel arms at the lower ends of the guide-rods, a beater having a screw-rod whose upper end is mounted in a socket in the handle, and a series of parallel fingers at the lower end of the screw-rod, the central finger being longer than the others and mounted in a socket between two of the arms of the frame, and a nut sliding on the guide-rods of the frame and engaging the screw-rod of the beater, substantially as described.

2. An egg-beater, comprising a frame formed of a single piece of wire bent to form parallel guide-rods and a series of doubled-up parallel arms at the lower ends of the guide-rods, a handle secured to the upper ends of the guide-rods, a beater formed of a single piece of wire bent to form a screw-rod and parallel fingers at the lower end of the screw-rod, the beater being mounted in the frame with its screw-rod projecting up between the guide-rods of said frame and its fingers between the arms thereof, and a nut sliding on said guide-rods and engaging the screw-rod of the beater, substantially as described.

3. An egg-beater, consisting of a frame formed of a single piece of wire bent to form parallel guide-rods and parallel arms at the lower ends of the guide-rods, a socket being formed between two of the said arms, a handle secured to the upper ends of the guide-rods, a beater formed of a piece of wire bent to form a screw-rod whose upper end is mounted in a socket in the handle and a series of parallel fingers at the lower end of the screw-rod, the central finger being longer than the others and mounted in the socket between the arms of the frame, and a nut sliding on the guide-rods and engaging the screw-rod, substantially as herein shown and described.

FRANK S. BELLANGER.

Witnesses:
FLORENCE CLOHESSEY,
HILAIRE RODIER.